(12) United States Patent
Lee et al.

(10) Patent No.: US 11,577,496 B2
(45) Date of Patent: *Feb. 14, 2023

(54) POLYAMIDE RESIN COMPOSITION AND MOLDED ARTICLE COMPRISING THE SAME

(71) Applicant: Lotte Chemical Corporation., Seoul (KR)

(72) Inventors: Sang Hwa Lee, Uiwang-si (KR); Yeong Deuk Seo, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 174 days.

This patent is subject to a terminal disclaimer.

(21) Appl. No.: 16/233,156

(22) Filed: Dec. 27, 2018

(65) Prior Publication Data
US 2019/0202186 A1 Jul. 4, 2019

(30) Foreign Application Priority Data

Dec. 31, 2017 (KR) .................. 10-2017-0185034
Nov. 14, 2018 (KR) .................. 10-2018-0139660

(51) Int. Cl.
*B32B 27/34* (2006.01)
*C08L 77/06* (2006.01)
(Continued)

(52) U.S. Cl.
CPC ............... *B32B 27/34* (2013.01); *C08K 9/04* (2013.01); *C08L 77/06* (2013.01);
(Continued)

(58) Field of Classification Search
CPC ... B32B 27/34; B32B 2307/308; C08L 77/06; C08L 2201/08; C08K 9/04;
(Continued)

(56) References Cited

U.S. PATENT DOCUMENTS

| 3,484,403 A | 12/1969 | Brunson |
| 3,877,965 A | 4/1975 | Broadbent et al. |

(Continued)

FOREIGN PATENT DOCUMENTS

| CN | 101861358 A | 10/2010 |
| CN | 101878252 A | 11/2010 |

(Continued)

OTHER PUBLICATIONS

Machine translation of JP 2003112920. (Year: 2003).*

(Continued)

*Primary Examiner* — John D Freeman
(74) *Attorney, Agent, or Firm* — Additon, Pendleton & Witherspoon, P.A.

(57) ABSTRACT

A polyamide resin composition and a molded article manufactured using the same. The polyamide resin composition includes: about 40 wt % to about 60 wt % of a polyamide resin including a repeat unit represented by Formula 1 and a repeat unit represented by Formula 2 as defined in the specification; about 1 wt % to about 10 wt % of a maleic anhydride-modified olefin-based copolymer; about 5 wt % to about 20 wt % of calcium carbonate subjected to surface treatment with a silane compound; and about 20 wt % to about 40 wt % of glass fibers, wherein the silane compound includes a functional group comprising an amino group, an epoxy group, and/or a (meth)acryloxy group. The polyamide resin composition and the molded article produced using the same can have good properties in terms of plating adhesion, impact resistance, thermal resistance, and/or appearance, and the like.

10 Claims, 1 Drawing Sheet

(51) Int. Cl.
*C08K 9/04* (2006.01)
*C08K 3/26* (2006.01)

(52) U.S. Cl.
CPC .. *B32B 2307/308* (2013.01); *C08K 2003/265* (2013.01); *Y10T 428/31725* (2015.04)

(58) Field of Classification Search
CPC ........ C08K 2003/265; C08K 2201/003; Y10T 428/31725
See application file for complete search history.

(56) References Cited

U.S. PATENT DOCUMENTS

| | | | |
|---|---|---|---|
| 4,552,626 A * | 11/1985 | Stevenson | C23C 18/22 205/168 |
| 4,780,505 A | 10/1988 | Mashita et al. | |
| 5,256,719 A | 10/1993 | Sham et al. | |
| 5,292,805 A | 3/1994 | Paschke et al. | |
| 5,324,766 A * | 6/1994 | Ikejiri | H05K 1/0346 524/433 |
| 6,117,561 A | 9/2000 | Jacquement et al. | |
| 6,617,381 B1 * | 9/2003 | Kumaki | C08K 7/04 524/112 |
| 9,845,389 B2 | 12/2017 | Harder et al. | |
| 9,932,444 B2 | 4/2018 | Washio et al. | |
| 10,450,460 B2 | 10/2019 | Kim et al. | |
| 2001/0003766 A1 | 6/2001 | Nozaki | |
| 2006/0100334 A1 * | 5/2006 | Ebert | C08K 3/26 524/425 |
| 2009/0127740 A1 | 5/2009 | Kirchner | |
| 2009/0142585 A1 | 6/2009 | Kobayashi et al. | |
| 2009/0143520 A1 * | 6/2009 | Elia | C25D 5/56 524/425 |
| 2010/0028602 A1 | 2/2010 | Naritomi et al. | |
| 2010/0160008 A1 | 6/2010 | Topoulos | |
| 2010/0237293 A1 | 9/2010 | Kirchner | |
| 2010/0324195 A1 | 12/2010 | Williamson | |
| 2012/0027983 A1 | 2/2012 | Elia | |
| 2012/0165445 A1 | 6/2012 | Lee et al. | |
| 2012/0196961 A1 | 8/2012 | Kobayashi et al. | |
| 2012/0196973 A1 | 8/2012 | Doshi et al. | |
| 2013/0165599 A1 | 6/2013 | Je et al. | |
| 2013/0209784 A1 | 8/2013 | Nakagawa et al. | |
| 2013/0237658 A1 | 9/2013 | Eguchi et al. | |
| 2014/0066561 A1 | 3/2014 | Pfleghar et al. | |
| 2014/0179851 A1 | 6/2014 | Pfleghar et al. | |
| 2014/0179866 A1 | 6/2014 | Pfleghar et al. | |
| 2015/0175804 A1 * | 6/2015 | Aepli | C08K 3/32 428/35.7 |
| 2015/0274968 A1 | 10/2015 | Bayer et al. | |
| 2015/0329670 A1 | 11/2015 | Washio et al. | |
| 2016/0083509 A1 | 3/2016 | Im et al. | |
| 2016/0102202 A1 * | 4/2016 | Lamberts | C08L 77/00 524/413 |
| 2016/0130439 A1 | 5/2016 | Koch et al. | |
| 2016/0369097 A1 | 12/2016 | Lee et al. | |
| 2018/0244917 A1 | 8/2018 | Kim et al. | |
| 2018/0244919 A1 | 8/2018 | Kim et al. | |
| 2019/0077957 A1 | 3/2019 | Yamada et al. | |
| 2019/0127579 A1 | 5/2019 | Kim et al. | |
| 2019/0203046 A1 | 7/2019 | Lee et al. | |
| 2021/0214555 A1 | 7/2021 | Seo et al. | |

FOREIGN PATENT DOCUMENTS

| | | |
|---|---|---|
| CN | 102264839 A | 11/2011 |
| CN | 102532887 A | 7/2012 |
| CN | 103003046 A | 3/2013 |
| CN | 103044905 A | 4/2013 |
| CN | 103339201 A | 10/2013 |
| CN | 103881368 A | 6/2014 |
| CN | 104725837 A | 6/2015 |
| CN | 104797631 A | 7/2015 |
| CN | 104854192 A | 8/2015 |
| CN | 105504800 A | 4/2016 |
| CN | 106046781 A | 10/2016 |
| CN | 107922732 A | 4/2018 |
| EP | 0368281 A1 | 5/1990 |
| EP | 0572266 A2 | 12/1993 |
| EP | 0690098 A2 | 1/1996 |
| EP | 2918624 A1 | 9/2015 |
| JP | 2003112920 A * | 4/2003 |
| JP | 2013-203851 A | 10/2013 |
| JP | 2013203851 A * | 10/2013 |
| JP | 2014-173057 A | 9/2014 |
| JP | 2015-071668 A | 4/2015 |
| JP | 2017-171879 A | 9/2017 |
| KR | 10-2010-0123178 A | 11/2010 |
| KR | 10-2013-0072513 A | 7/2013 |
| KR | 10-2013-0132437 A | 12/2013 |
| KR | 10-2014-0108517 A | 9/2014 |
| KR | 10-2016-0035954 A | 4/2016 |
| KR | 10-2017-0024201 A | 3/2017 |
| KR | 10-2017-0026833 A | 3/2017 |
| KR | 10-2017-099297 A | 8/2017 |
| WO | 2014/073219 A1 | 5/2014 |
| WO | 2017/034295 A1 | 3/2017 |
| WO | 2019/231160 A1 | 12/2019 |

OTHER PUBLICATIONS

Machine translation of JP 2013203851. (Year: 2013).*
Office Action in commonly owned Chinese Application No. 201680048870.3 dated Aug. 16, 2019, pp. 1-6.
Office Action in commonly owned U.S. Appl. No. 15/754,328 dated Sep. 5, 2019, pp. 1-18.
Supplementary Search Report in commonly owned European Application No. 16839584.6 dated Apr. 16, 2019, pp. 1-7.
Office Action in commonly owned Korean Application No. 10-2017-0185031 dated Dec. 5, 2019, pp. 1-5.
International Search Report in commonly owned International Application No. PCT/KR2016/009307, dated Nov. 16, 2016, pp. 1-6.
Non-Final Office Action in commonly owned U.S. Appl. No. 15/754,328 dated May 8, 2019, pp. 1-18.
Office Action in counterpart Korean Application No. 10-2018-0139660 dated Sep. 7, 2020, pp. 1-5.
Office Action in commonly owned Chinese Application No. 201811635926.2 dated Jan. 28, 2021, pp. 1-10.
Office Action in counterpart Chinese Application No. 201811617729.8 dated Dec. 21, 2020, pp. 1-6.
Bartczak et al., "Toughness mechanism in semi-crystalline polymer blends: II. High-density polyethylene toughened with calcium carbonate filler particles", Polymer 40 (1999) pp. 2347-2365.
Nylon 6T—Polymer Properties Database, Semi-aromatic polyamides (6T, DT, 6I), (Year: 2020), pp. 1-2.
Kim—KR 2017-0024201 A MT-KOR#1—2017, pp. 1-14.
Kim KR 2017-0026833 A—MT-KOR#2—aromatic+aliphatic polyamide+chelating agent—2017, pp. 1-16.
Office Action in commonly owned Chinese Application No. 201811247837.0 dated Nov. 17, 2020, pp. 1-8.
Xia Shengli et al., "Properties of PA66/EPDM-g-MAH/CaCO3 Composites" Department of Chemical and Biological Engineering, Nantong Vocational University, Nantong, China, vol. 45, No. 10, Oct. 2017, pp. 119-125.
International Search Report in commonly owned International Application No. PCT/KR2019/006091 dated Aug. 22, 2019, pp. 1-6.
Non-Final Office Action in commonly owned U.S. Appl. No. 16/234,894 dated Feb. 17, 2022, pp. 1-15.
Advisory Action in commonly owned U.S. Appl. No. 16/234,894 dated Sep. 8, 2021, pp. 1-3.
Final Office Action in commonly owned U.S. Appl. No. 16/234,894 dated May 19, 2021, pp. 1-8.
Non-Final Office Action in commonly owned U.S. Appl. No. 16/234,894 dated Nov. 4, 2020, pp. 1-9.
Non-Final Office Action in commonly owned U.S. Appl. No. 16/170,190 dated Sep. 10, 2020, pp. 1-17.
Final Office Action in commonly owned U.S. Appl. No. 16/170,190 dated Jan. 8, 2021, pp. 1-14.

(56) References Cited

OTHER PUBLICATIONS

Advisory Action in commonly owned U.S. Appl. No. 16/170,190 dated Mar. 17, 2021, pp. 1-8.
Non-Final Office Action in commonly owned U.S. Appl. No. 16/170,190 dated Jun. 29, 2021, pp. 1-18.
Final Office Action in commonly owned U.S. Appl. No. 16/170,190 dated Oct. 12, 2021, pp. 1-16.
Advisory Action in commonly owned U.S. Appl. No. 16/170,190 dated Mar. 2, 2022, pp. 1-6.
Office Action in commonly owned U.S. Appl. No. 16/170,190 dated Apr. 29, 2022, pp. 1-20.
Yamada—JP 2017-171879 A Biblio—aromatic PA+aliphatic PA + PE wax + calcium carb 1-50 um—Sep. 28, 2017 (Year: 2017) pp. 1.
Notice of Allowance in commonly owned U.S. Appl. No. 16/170,190 dated Jan. 17, 2023, pp. 1-20.
Office Action in commonly owned Chinese Application No. 201980045516.9 dated Oct. 19, 2022, pp. 1-6.

* cited by examiner

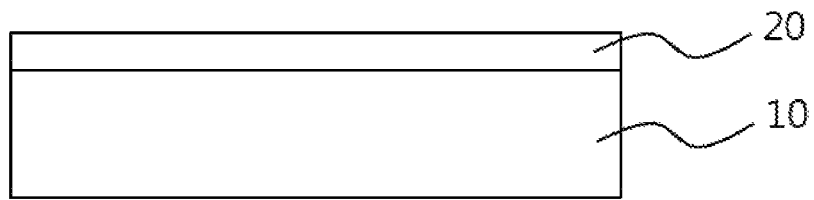

POLYAMIDE RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2017-0185034, filed Dec. 31, 2017, and Korean Patent Application No. 10-2018-0139660, filed Nov. 14, 2018, the entire disclosure of each of which is incorporated herein by reference.

FIELD

The present disclosure relates to a polyamide resin composition and a molded article comprising the same.

BACKGROUND

An aromatic polyamide resin, such as a polyphthalamide resin, has a lower specific gravity than glass or metal and exhibits good properties in terms of thermal resistance, wear resistance, and chemical resistance. With such advantages, the polyamide resin is used for housings of electric/electronic products, internal/external materials for automobiles and buildings, and the like. In particular, with a recent trend toward weight reduction and compactness of products, plastic products manufactured using thermoplastic resins are rapidly replacing glass or metal products.

In addition, in order to realize such advantages of a polyamide resin while maintaining an aesthetically pleasing appearance by providing metallic appearance, a technique for plating the polyamide resin has been developed. Plating of the polyamide resin is performed for the purpose of decoration and corrosion resistance, and secures good properties in terms of plating appearance and adhesion (plating adhesion and wettability) between a plating layer and a resin.

To this end, there is developed a method of adding an inorganic material or an epoxy group-containing polyolefin to a polyamide resin composition in order to improve wettability. However, this method can deteriorate impact resistance of the resin composition and thus allows a limited range of application thereof. In addition, although a method of alloying a polyamide resin with an acrylonitrile-butadiene-styrene (ABS) resin or a polycarbonate resin has been suggested in order to improve wettability of the resin composition, this method can deteriorate thermal resistance of the resin composition.

Therefore, there is a need for a polyamide resin composition that can secure good properties in terms of plating adhesion (wettability), impact resistance, thermal resistance, and/or appearance, and the like.

SUMMARY OF THE INVENTION

The present disclosure relates to a polyamide resin composition that can have good properties in terms of plating adhesion, impact resistance, thermal resistance, fluidity, and/or appearance and the like, and a molded article formed of the same.

The polyamide resin composition may include: about 40 wt % to about 60 wt % of a polyamide resin comprising a repeat unit represented by Formula 1 and a repeat unit represented by Formula 2; about 1 wt % to about 10 wt % of a maleic anhydride-modified olefin-based copolymer; about 5 wt % to about 20 wt % of calcium carbonate subjected to surface treatment (surface treated) with a silane compound; and about 20 wt % to about 40 wt % of glass fibers, wherein the silane compound comprises a functional group comprising an amino group, an epoxy group, and/or a (meth)acryloxy group:

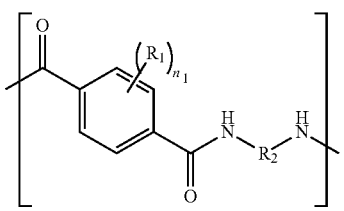

[Formula 1]

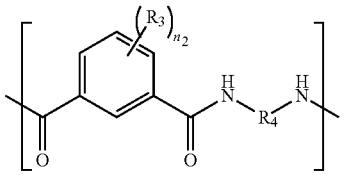

[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n_1$ and $n_2$ are the same or different and are each independently an integer of 0 to 4.

The polyamide resin may comprise about 60 mol % to about 80 mol % of the repeat unit represented by Formula 1 and about 20 mol % to about 40 mol % of the repeat unit represented by Formula 2.

The maleic anhydride-modified olefin-based copolymer may include a maleic anhydride-modified ethylene-α-olefin copolymer obtained by graft copolymerization of maleic anhydride to an ethylene-α-olefin copolymer.

The maleic anhydride-modified olefin-based copolymer may include a maleic anhydride-modified ethylene-octene copolymer.

The calcium carbonate subjected to surface treatment with the silane compound may have an average particle size of about 40 nm to about 150 nm.

A surface of the calcium carbonate may be entirely or partly subjected to surface treatment with the silane compound.

A weight ratio of the maleic anhydride-modified olefin-based copolymer to the calcium carbonate subjected to surface treatment with the silane compound may range from about 1:1 to about 1:5.

The polyamide resin composition may have a plating adhesive strength of about 15 N/cm to about 30 N/cm, as measured on an injection-molded specimen plated with a 30 μm thick chromium layer and having a size of 10 cm×10 cm×3.2 cm at a peeling rate of 50 mm/min using a tensile tester in accordance with JIS C6481.

The polyamide resin composition may have a notched Izod impact strength of about 8 kgf cm/cm or more, as measured on a ⅛" thick specimen in accordance with ASTM D256.

The polyamide resin composition may have a heat deflection temperature (HDT) of about 280° C. or more, as measured under a load of 18.56 kgf/cm² at a heating rate of 120° C./hr in accordance with ASTM D648.

The present disclosure also relates to a molded article. The molded article includes: a base layer; and a plating layer formed on at least one surface of the base layer, wherein the base layer is formed of the polyamide resin composition set forth above.

BRIEF DESCRIPTION OF THE DRAWINGS

FIG. 1 is a schematic sectional view of a molded article according to one embodiment of the present invention.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways by those skilled in the art without departing from the scope of the present invention.

Rather, the embodiments are provided for complete disclosure and to provide thorough understanding of the present invention by those skilled in the art. The scope of the present invention should be defined only by the appended claims.

A polyamide resin composition according to the present disclosure includes: (A) a polyamide resin; (B) a maleic anhydride-modified olefin-based copolymer; (C) calcium carbonate subjected to surface treatment with a silane compound; and (D) glass fibers.

Herein, "a to b" indicating a certain numerical range is defined as "≥a and ≤b".

(A) Polyamide Resin

According to the present disclosure, the polyamide resin includes a repeat unit represented by Formula 1 and a repeat unit represented by Formula 2 to improve plating adhesion and/or thermal resistance of the resin composition (molded article):

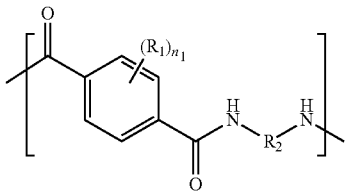
[Formula 1]

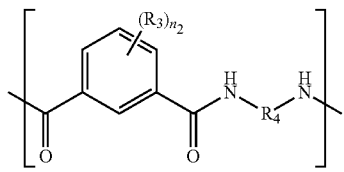
[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and n1 and n2 are the same or different and are each independently an integer of 0 to 4.

As used herein, the term hydrocarbon group refers to a $C_1$ to $C_6$ linear, branched, or cyclic, saturated or unsaturated, alkyl group.

The polyamide resin may include about 60 mol % to about 80 mol %, for example, about 65 mol % to about 75 mol %, of the repeat unit represented by Formula 1, and about 20 mol % to about 40 mol %, for example, about 25 mol % to about 35 mol %, of the repeat unit represented by Formula 2.

In some embodiments, the polyamide resin can include the repeat unit represented by Formula 1 in an amount of about 60, 61, 62, 63, 64, 65, 66, 67, 68, 69, 70, 71, 72, 73, 74, 75, 76, 77, 78, 79, or 80 mol % based on the total mol % (100 mol %) of the polyamide resin. Further, according to some embodiments, the repeat unit represented by Formula 1 may be present in an amount of from about any of the foregoing amounts to about any other of the foregoing amounts.

In some embodiments, the polyamide resin can include the repeat unit represented by Formula 2 in an amount of about 20, 21, 22, 23, 24, 25, 26, 27, 28, 29, 30, 31, 32, 33, 34, 35, 36, 37, 38, 39, or 40 mol % based on the total mol % (100 mol %) of the polyamide resin. Further, according to some embodiments, the repeat unit represented by Formula 2 may be present in an amount of from about any of the foregoing amounts to about any other of the foregoing amounts.

Within this content range, the polyamide resin composition can exhibit good plating adhesion and/or thermal resistance.

The polyamide resin may be prepared through polymerization of a dicarboxylic acid component comprising about 60 mol % to about 80 mol %, for example, about 65 mol % to about 75 mol %, of terephthalic acid, in which a hydrogen atom in a phenylene group is substituted or unsubstituted with $R_1$, and/or an (C1-$C_{10}$) alkyl ester thereof, and about 20 mol % to about 40 mol %, for example, about 25 mol % to about 35 mol %, of isophthalic acid, in which a hydrogen atom in a phenylene group is substituted or unsubstituted with $R_3$, and/or an (C1-$C_{10}$) alkyl ester thereof; and a $C_6$ to $C_{12}$ linear and/or branched alkylene group-containing aliphatic diamine component, for example hexane-1,6-diamine (hexamethylenediamine, HMDA), heptane-1,7-diamine, octane-1,8-diamine, nonane-1,9-diamine, decane-1,10-diamine, undecane-1,11-diamine, and/or dodecane-1,12-diamine, and the like by a method known in the art.

The polyamide resin may have a glass transition temperature of about 100° C. to about 150° C., for example, about 120° C. to about 140° C., as measured using a differential scanning calorimeter (DSC). Within this range, the polyamide resin composition can exhibit good properties in terms of thermal resistance and/or plating adhesion, and the like.

In addition, the first polyamide resin may have an intrinsic viscosity (11) of about 0.7 dL/g to about 1.2 dL/g, for example, about 0.8 dL/g to about 1.0 dL/g, as measured using an Ubbelohde viscometer at 25° C. after being dissolved to a concentration of 0.5 g/dL in a sulfuric acid solution (98%). Within this range, the polyamide resin composition can exhibit good processability and/or appearance.

The polyamide resin composition can include the polyamide resin in an amount of about 40 wt % to about 60 wt %, for example, about 45 wt % to about 58 wt %, based on 100 wt % of the polyamide resin composition. In some embodiments, the polyamide resin composition can include the polyamide resin in an amount of about 40, 41, 42, 43, 44, 45, 46, 47, 48, 49, 50, 51, 52, 53, 54, 55, 56, 57, 58, 59, or 60 wt % based on 100 wt % of the polyamide resin composition. Further, according to some embodiments, the polyamide resin may be present in an amount of from about any of the foregoing amounts to about any other of the foregoing amounts.

If the content of the polyamide resin is less than about 40 wt %, the polyamide resin composition can suffer from deterioration in plating adhesion, thermal resistance, and/or appearance, and the like, and if the content of the polyamide resin exceeds about 60 wt %, the polyamide resin composition can suffer from deterioration in plating adhesion, fluidity, processability, and/or injection moldability, and the like.

(B) Maleic Anhydride-Modified Olefin-Based Copolymer

The maleic anhydride-modified olefin-based copolymer is a reactive olefin-based copolymer obtained by graft polymerization of maleic anhydride, which is a functional group capable of reacting with the polyamide resin, to an olefin-based copolymer, and serves to improve plating adhesion (wettability) between a plating layer and a molded article produced from the polyamide resin composition upon plating of the molded article while improving impact resistance of the polyamide resin composition.

The maleic anhydride-modified olefin-based copolymer may be obtained by graft polymerization of maleic anhydride to an olefin-based copolymer obtained by copolymerization of at least two olefin-based monomers. The olefin-based copolymer may be a $C_1$ to $C_{19}$ alkylene and may include, for example, ethylene, propylene, isopropylene, butylene, isobutylene, octene, and combinations thereof.

The maleic anhydride-modified olefin-based copolymer may include a maleic anhydride-modified ethylene-α-olefin copolymer obtained through graft polymerization of maleic anhydride to an ethylene-α-olefin copolymer.

The maleic anhydride-modified olefin-based copolymer may include a maleic anhydride-modified ethylene-octene copolymer.

The maleic anhydride-modified olefin-based copolymer may include about 0.1 to about 5 parts by weight, for example, about 0.5 to about 2 parts by weight, of maleic anhydride relative to about 100 parts by weight of the olefin-based copolymer. In some embodiments, the maleic anhydride-modified olefin-based copolymer can include maleic anhydride in an amount of about 0.1, 0.2, 0.3, 0.4, 0.5, 0.6, 0.7, 0.8, 0.9, 1, 2, 3, 4, or 5 parts by weight relative to about 100 parts by weight of the maleic anhydride-modified olefin-based copolymer. Further, according to some embodiments, maleic anhydride may be present in an amount of from about any of the foregoing amounts to about any other of the foregoing amounts.

Within this content range, the maleic anhydride-modified olefin-based copolymer can have good compatibility with the polyamide resin and/or can significantly improve plating adhesion.

The polyamide resin composition can include the maleic anhydride-modified olefin-based copolymer in an amount of about 1 wt % to about 10 wt %, for example, about 3 wt % to about 9 wt %, based on 100 wt % of the polyamide resin. In some embodiments, the polyamide resin composition can include the maleic anhydride-modified olefin-based copolymer in an amount of about 1, 2, 3, 4, 5, 6, 7, 8, 9, or 10 wt %, based on 100 wt % of the polyamide resin composition. Further, according to some embodiments, the maleic anhydride-modified olefin-based copolymer may be present in an amount of from about any of the foregoing amounts to about any other of the foregoing amounts.

If the content of the maleic anhydride-modified olefin-based copolymer is less than about 1 wt %, the polyamide resin composition can suffer from deterioration in plating adhesion and/or impact resistance, and the like, and if the content of the maleic anhydride-modified olefin-based copolymer exceeds about 10 wt %, the polyamide resin composition can suffer from deterioration in thermal resistance and/or rigidity, and the like.

(C) Calcium Carbonate Subjected to Surface Treatment with a Silane Compound

The calcium carbonate subjected to surface treatment with a silane compound promotes effective anchoring of a catalyst during a plating process, thereby significantly improving plating adhesion of the polyamide resin composition while improving appearance thereof. The calcium carbonate subjected to surface treatment with the silane compound may have a spherical and/or powder shape.

The calcium carbonate subjected to surface treatment with the silane compound may have an average particle diameter D50 (a diameter at a distribution rate of 50%) of about 40 nm to about 150 nm, for example, about 50 nm to about 90 nm. Wherein, the term "average particle diameter D50" refers to particle diameters of the inorganic filler, the mass percentages of which correspond to 50 wt % on the cumulative particle diameter distribution curve plotted by measuring the particle diameters of the inorganic filler. The particle diameters of the inorganic filler may be measured using a particle size analyzer (PSA).

If the average particles size of the surface-treated calcium carbonate is less than about 40 nm, it can be difficult to disperse the calcium carbonate upon processing, and if the average particles size of the surface-treated calcium carbonate exceeds about 150 nm, the surface-treated calcium carbonate can generate blisters upon rapid temperature variation such as temperature variation in heat cycle evaluation.

Surface treatment of calcium carbonate may be performed using a silane compound as a surface treatment agent. Here, the silane coupling agent may be include at least one functional group selected from the group consisting of an amino group, an epoxy group (glydoxy group), a (meth) acryloxy group, and combinations thereof. In addition, surface treatment of the calcium carbonate may be performed by a typical method and may be performed on the entirety or part of the surface of the calcium carbonate.

Examples of the silane compound may include without limitation 3-glycidoxypropyltrimethoxysilane, 3-glycidoxypropyltriethoxysilane, β-(3,4-epoxycyclohexyl)ethyltrimethoxysilane, 3-glycidoxypropylmethyldiethoxysilane, γ-glycidoxypropyltrimethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-β-(aminoethyl)-γ-aminopropylmethyldimethoxysilane, N-β-(aminoethyl)-γ-aminopropyltrimethoxysilane, N-β-(aminoethyl)-γ-aminopropyltriethoxysilane, γ-aminopropyltrimethoxysilane, γ-aminopropyltriethoxysilane, N-phenyl-γ-aminopropyltrimethoxysilane, and the like, and combinations thereof.

The surface-treated calcium carbonate may include about 100 parts by weight of calcium carbonate and about 0.01 to about 1.0 part by weight, for example, about 0.02 to about 0.5 parts by weight, of the silane compound. In some embodiments, the surface-treated calcium carbonate can include the silane compound in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1 part by weight. Further, according to some embodiments, the silane compound may be present in an amount of from about any of the foregoing amounts to about any other of the foregoing amounts.

Within this range, the polyamide resin composition can exhibit good properties in terms of plating adhesion and/or thermal resistance, and the like.

The polyamide resin composition can include the calcium carbonate subjected to surface treatment with the silane compound in an amount of about 5 wt % to about 20 wt %, for example, about 8 wt % to about 15 wt %, based on 100 wt % of the polyamide resin composition. In some embodiments, the polyamide resin composition can include the calcium carbonate subjected to surface treatment with the silane compound in an amount of about 5, 6, 7, 8, 9, 10, 11, 12, 13, 14, 15, 16, 17, 18, 19, or 20 wt %, based on 100 wt % of the polyamide resin composition. Further, according to some embodiments, the calcium carbonate subjected to surface treatment with the silane compound may be present in an amount of from about any of the foregoing amounts to about any other of the foregoing amounts.

If the content of the surface-treated calcium carbonate is less than about 5 wt %, the polyamide resin composition can suffer from deterioration in plating adhesion and/or mechanical properties, and if the content of the surface-treated calcium carbonate exceeds about 20 wt %, the polyamide resin composition can suffer from deterioration in impact resistance and the like.

The maleic anhydride-modified olefin-based copolymer (B) and the surface-treated calcium carbonate (C) may be present in a weight ratio (B:C) of about 1:1 to about 1:5, for example, about 1:1 to about 1:2. In some embodiments, the maleic anhydride-modified olefin-based copolymer (B) and the surface-treated calcium carbonate (C) may be present in a weight ratio (B:C) of about 1:1, 1:2, 1:3, 1:4, or 1:5. Within this range, the polyamide resin composition can generate less blistering and/or exhibit good properties in terms of plating adhesion, thermal resistance, and/or appearance, and the like.

(D) Glass Fibers

According to one embodiment, the glass fibers can serve to improve mechanical properties, such as rigidity and the like, of the polyamide resin composition and may be selected from glass fibers used in typical thermoplastic resin compositions.

The glass fibers have a fiber shape and may have various cross-sectional shapes, such as a circular shape, an elliptical shape, and/or a rectangular shape, and the like. For example, glass fibers having a circular cross-sectional shape and/or a rectangular cross-sectional may be used to improve mechanical strength of the polyamide resin composition.

The glass fibers having a circular cross-sectional shape may have a diameter of about 5 μm to about 20 μm and a length of about 2 mm to about 20 mm before processing. In addition, the glass fibers having a rectangular cross-sectional shape may have an aspect ratio of about 1.5 to about 10 and a length of about 2 mm to about 20 mm before processing. Within this range, the polyamide resin composition can have improved properties in terms of rigidity and/or processability, and the like.

The polyamide resin composition can include the glass fibers in an amount of about 20 wt % to about 40 wt %, for example, about 25 wt % to about 35 wt %, based on 100 wt % of the polyamide resin composition. In some embodiments, the polyamide resin composition can include the glass fibers in an amount of about 20, 21, 22, 23, 24, 25, 26, 27, 28, 29, 30, 31, 32, 33, 34, 35, 36, 37, 38, 39, or 40 wt % based on 100 wt % of the polyamide resin composition. Further, according to some embodiments, the glass fibers may be present in an amount of from about any of the foregoing amounts to about any other of the foregoing amounts.

If the content of the glass fibers is less than about 20 wt %, the polyamide resin composition can suffer from deterioration in mechanical properties, and if the content of the glass fibers exceeds about 40 wt %, the polyamide resin composition and a molded article formed therefrom can suffer from deterioration in appearance, extrusion moldability, and/or plating adhesion, and the like.

The polyamide resin composition according to one embodiment of the invention may further optionally include one or more than one typical additives included in a typical thermoplastic resin composition. Examples of the additives may include flame retardants, lubricants, plasticizers, heat stabilizers, antioxidants, photostabilizers, colorants, and mixtures thereof, without being limited thereto. The additives may be present in amount of about 0.001 to about 40 parts by weight, for example, about 0.1 to about 20 parts by weight, relative to about 100 parts by weight of the polyamide resin composition.

The polyamide resin composition according to one embodiment of the invention may be prepared in pellet form by mixing the components described above, followed by melt kneading through a typical twin-screw extruder at about 200° C. to about 350° C., for example, about 250° C. to about 300° C.

The polyamide resin composition may have a plating adhesive strength of about 15 N/cm to about 30 N/cm, for example, about 19 N/cm to about 25 N/cm, as measured on an injection-molded specimen plated with a 30 μm thick chromium layer and having a size of 10 cm×10 cm×3.2 cm at a peeling rate of 50 mm/min using a tensile tester in accordance with JIS C6481.

The polyamide resin composition may have a notched Izod impact strength of about 8 kgf·cm/cm or more, for example, about 8.2 kgf·cm/cm to about 15 kgf·cm/cm, as measured on a ⅛" thick specimen in accordance with ASTM D256.

The polyamide resin composition may have a heat deflection temperature (HDT) of about 280° C. or more, for example, about 282° C. to about 300° C., as measured under a load of 18.56 kgf/cm$^2$ at a heating rate of 120° C./hr in accordance with ASTM D648.

The polyamide resin composition may have heat resistance as determined by no blisters on a specimen injection molded at a molding temperature of 320° C. and a mold temperature of 130° C. in a 6 oz. injection molding machine and having a size of 10 cm×10 cm×3.2 cm after the specimen is subjected to aging in an oven at a temperature of −40° C. for 1 hour, left at room temperature for 30 minutes, subjected to aging in an oven at a temperature of 250° C. for 2 hours, and left at room temperature for 30 minutes; repeating this cycle is repeated three times; and then observing generation of blisters on the specimens with the naked eye.

The polyamide resin composition may have a surface gloss of 90 to 110 measured at a reflection angle of 75° on a specimen injection molded at a molding temperature of 320° C. and a mold temperature of 130° C. in a 6 oz. injection molding machine and having a size of 10 cm×10 cm×3.2 cm using a gloss meter (Micro-gloss, BYK Co., Ltd.).

FIG. 1 is a schematic view of a molded article according to one embodiment of the present disclosure. It should be noted that the drawing is exaggerated in thickness of lines and/or size of components for descriptive convenience and clarity only. In addition, it should be understood that the present disclosure is not limited to the drawings and may be realized in various shapes. As shown in FIG. 1, the molded article according to the embodiment of the disclosure includes a base layer 10; and a plating layer 20 formed on at least one surface of the base layer 10, wherein the base layer 10 is formed of the polyamide resin composition according to the present disclosure.

In some embodiments, the base layer 10 may be formed in various shapes from the polyamide resin composition by various molding methods, such as injection molding, extrusion molding, vacuum molding, casting, and the like. Such molding methods are well known to those skilled in the art.

In some embodiments, the plating layer 20 may be formed by a typical method for manufacturing a plated plastic product. For example, the plating layer 20 may be formed by etching the base layer 10 and forming an anchor on an etched region, followed by plating, for example, electroless plating and/or electric plating, without being limited thereto.

In other embodiments, plating may be performed by typical wet plating and/or dry plating such as chemical vapor deposition (CVD), physical vapor deposition (PVD), plasma CVD, and/or spray coating, in addition to electroless plating and/or electric plating.

In addition, a plating process according to the present disclosure may be a plating process applicable to a base layer formed of typical ABS and/or PC/ABS, and the like. Typically, since a base layer formed of a polyamide resin composition suffers from a high defect rate upon etching with a typical etching solution, the base layer formed of the polyamide resin composition requires an exclusive etching solution and an exclusive plating line, thereby causing increase in manufacturing costs. However, the base layer formed of the polyamide resin composition according to the present disclosure allows plating using an existing plating line and an existing etching solution without causing such problems.

In some embodiments, the plating layer 20 may include chromium, nickel and/or copper, and may have a thickness of about 0.1 µm to about 100 µm, without being limited thereto.

The molded article can exhibit good plating adhesion between the base layer and the plating layer, and can secure good properties of the base layer in terms of appearance, impact resistance, and/or thermal resistance. Thus, the molded article can be advantageously used as interior/exterior materials having a metallic appearance for automobiles, electronic/electric products, and/or office equipment, without being limited thereto.

Next, the present invention will be described in more detail with reference to the following examples. However, it should be understood that these examples are provided for illustration only and are not to be construed in any way as limiting the present invention.

EXAMPLES

Details of components used in Examples and Comparative Examples are as follows.

(A) Aromatic Polyamide Resin (A1) Polyamide 6T/6I (Product Name: A8002, 6T:6I (mole ratio)=70:30, intrinsic viscosity [η]: 0.88 dL/g, Solvay Co., Ltd.) is used.

(A2) Polyamide 6T/66 (Product Name: A6000, 6T:66 (mole ratio)=55:44, intrinsic viscosity [η]: 0.85 dL/g, Solvay Co., Ltd.) is used.

(B) Olefin-Based Copolymer (B1) Maleic anhydride-modified ethylene-octene copolymer (Product Name: Fusabond N493D, DuPont) is used.

(B2) Ethylene-octene copolymer (Product Name: Engage 8842, DuPont) is used.

(C) Calcium Carbonate (C1) Calcium carbonate subjected to surface treatment with aminopropyltrimethoxysilane (average particle size (D50): 70 nm) is used. The calcium carbonate subjected to surface treatment with aminopropyltrimethoxysilane is prepared by a typical surface treatment process, in which calcium carbonate subjected to no surface treatment (without a surface treatment) is dried in an oven at 80° C. for 12 hours and then is dispersed in a mixture of ethanol and distilled water, followed by adding a predetermined amount of aminopropyltrimethoxysilane thereto and stirring at 40° C. to 80° C. for 12 to 24 hours.

(C2) Calcium carbonate subjected to surface treatment with glycidoxypropyltrimethoxysilane (average particle size (D50): 70 nm) is used. The calcium carbonate subjected to surface treatment with glycidoxypropyltrimethoxysilane is prepared by a typical surface treatment process, in which calcium carbonate subjected to no surface treatment (without a surface treatment) is dried in an oven at 80° C. for 12 hours and then is dispersed in a mixture of ethanol and distilled water, followed by adding a predetermined amount of glycidoxypropyltrimethoxysilane thereto and stirring at 40° C. to 80° C. for 12 to 24 hours.

(C3) Calcium carbonate subjected to surface treatment with 3-methacryloxypropyltrimethoxysilane (average particle size (D50): 70 nm) is used. The calcium carbonate subjected to surface treatment with 3-methacryloxypropyltrimethoxysilane is prepared by a typical surface treatment process, in which calcium carbonate subjected to no surface treatment (without a surface treatment) is dried in an oven at 80° C. for 12 hours and then is dispersed in a mixture of ethanol and distilled water, followed by adding a predetermined amount of 3-methacryloxypropyltrimethoxysilane thereto and stirring at 40° C. to 80° C. for 12 to 24 hours.

(C4) Calcium carbonate subjected to no surface treatment (without a surface treatment) (Product Name: UP, average particle diameter (D50): 70 nm, Solvay Co., Ltd.) is used.

(C5) Calcium carbonate subjected to surface treatment with a stearate compound (Product Name: U1S1, average particle diameter (D50): 70 nm, Solvay Co., Ltd.) is used.

(D) Glass fibers (Product Name: T-251H, Nippon Electric Glass Co., Ltd.) is used.

Examples 1 to 5 and Comparative Examples 1 to 6

The components set forth above are mixed in amounts as listed in Tables 1 and 2, followed by extrusion molding at 300° C. to prepare a polyamide resin composition in pellet form. Extrusion molding is performed using a twin-screw extruder having L/D=36 and a diameter of 45 mm. The prepared pellets are dried at 80° C. to 100° C. for 4 hours or more and subjected to injection molding at a molding temperature of 320° C. at a mold temperature of 130° C. in a 6 oz. injection molding machine, thereby preparing specimens. The prepared specimens are evaluated as to the following properties. Results are shown in Tables 1 and 2.

Property Evaluation (1) Plating adhesive strength (N/cm): Adhesive strength between a base layer and a plating layer is measured on an injection-molded specimen (injection molded at a molding temperature of 320° C. and a mold temperature of 130° C. in a 6 oz. injection molding machine as discussed above) plated with a 30 μm thick chromium layer and having a size of 10 cm×10 cm×3.2 cm using a tensile tester in accordance with JIS C6481. For measurement of adhesive strength between the base layer and the plating layer, a central portion of the chromium layer is cut and secured to a fixture of the tensile tester and stretched at a peeling rate of 50 mm/min at a right angle with respect to the surface of the plating layer.

(2) Notched Izod impact strength (unit: kgf·cm/cm): Notched Izod impact strength is measured on a ⅛" thick notched specimen (injection molded at a molding temperature of 320° C. and a mold temperature of 130° C. in a 6 oz. injection molding machine as discussed above) in accordance with ASTM D256.

(3) Heat deflection temperature (° C.): Heat deflection temperature (HDT, unit: ° C.) is measured under a load of 18.56 kgf/cm$^2$ at a heating rate of 120° C./hr in accordance with ASTM D648.

(4) Heat cycle evaluation: Each of injection-molded specimens prepared in the Examples and Comparative Examples (injection molded at a molding temperature of 320° C. and a mold temperature of 130° C. in a 6 oz. injection molding machine as discussed above) and having a size of 10 cm×10 cm×3.2 cm is subjected to aging in an oven at a temperature of −40° C. for 1 hour, left at room temperature for 30 minutes, subjected to aging in an oven at a temperature of 250° C. for 2 hours, and left at room temperature for 30 minutes. After this cycle is repeated three times, generation of blisters on the specimens is observed with the naked eye.

(5) Surface roughness (gloss, unit: GU): Surface gloss is measured at a reflection angle of 75° on each of the injection-molded specimens prepared in the Examples and Comparative Examples (injection molded at a molding temperature of 320° C. and a mold temperature of 130° C. in a 6 oz. injection molding machine as discussed above) and having a size of 10 cm×10 cm×3.2 cm using a gloss meter (Micro-gloss, BYK Co., Ltd.).

TABLE 1

| | Example | | | | |
|---|---|---|---|---|---|
| | 1 | 2 | 3 | 4 | 5 |
| (A1) (wt %) | 54 | 52 | 47 | 52 | 52 |
| (B1) (wt %) | 8 | 8 | 8 | 8 | 8 |
| (C1) (wt %) | 8 | 10 | 15 | — | — |
| (C2) (wt %) | — | — | — | 10 | — |
| (C3) (wt %) | — | — | — | — | 10 |
| (D) (wt %) | 30 | 30 | 30 | 30 | 30 |
| Plating adhesive strength | 20 | 21 | 19 | 18 | 20 |
| Notched Izod impact strength | 9.1 | 8.3 | 8.5 | 9.1 | 8.9 |
| Heat deflection temperature | 283 | 282 | 283 | 283 | 282 |
| Generation of blisters | Absent | Absent | Absent | Absent | Absent |
| Surface roughness | 102 | 102 | 102 | 102 | 102 |

TABLE 2

| | Comparative Example | | | | | |
|---|---|---|---|---|---|---|
| | 1 | 2 | 3 | 4 | 5 | 6 |
| (A1) (wt %) | 54 | 52 | 47 | — | 52 | 52 |
| (A2) (wt %) | — | — | — | 52 | — | — |
| (B1) (wt %) | 8 | 8 | 8 | 8 | — | 8 |
| (B2) (wt %) | — | — | — | — | 8 | — |
| (C1) (wt %) | — | — | — | 10 | 10 | — |
| (C4) (wt %) | 8 | 10 | 15 | — | — | — |
| (C5) (wt %) | — | — | — | — | — | 10 |
| (D) (wt %) | 30 | 30 | 30 | 30 | 30 | 30 |
| Plating adhesive strength | 9 | 9 | 9 | 1 | 10 | 13 |
| Notched Izod impact strength | 8.7 | 7.2 | 9.4 | 9.7 | 8.1 | 8.5 |
| Heat deflection temperature | 284 | 282 | 279 | 288 | 280 | 282 |
| Generation of blisters | Present | Present | Present | Present | Present | Present |
| Surface roughness | 85 | 83 | 88 | 94 | 92 | 85 |

As can be seen from the results, the polyamide resin compositions according to the present invention have good properties in terms of plating adhesion, impact resistance, thermal resistance, and appearance, and did not suffer from appearance variation such as generation of blisters.

In contrast, it could be seen that the polyamide resin compositions of Comparative Examples 1 to 3 prepared using calcium carbonate subjected to no surface treatment (C4) instead of calcium carbonate subjected to surface treatment with silane compounds (C1) to (C3) suffer from deterioration in plating adhesion strength and also thermal resistance and appearance due to generation of blisters upon heat cycle evaluation; the polyamide resin composition of Comparative Example 4 prepared using the polyamide 6T/66 (A2) instead of the polyamide resin (A1) according to the present invention did not allow substantial plating and also suffers from deterioration in thermal resistance and appearance due to generation of blisters upon heat cycle evaluation; and the polyamide resin composition of Comparative Example 5 prepared using the olefin-based copolymer (B2) instead of the maleic anhydride-modified olefin-based copolymer (B1) has low plating adhesive strength and suffered from deterioration in thermal resistance and appearance due to generation of blisters upon heat cycle evaluation. In addition, it could be seen that the polyamide resin composition of Comparative Example 6 prepared using calcium carbonate subjected to surface treatment with the stearate compound (C5) instead of the calcium carbonate subjected to surface treatment with silane compounds (C1)

to (C3) suffers from deterioration in plating adhesive strength and also thermal resistance and appearance due to generation of blisters upon heat cycle evaluation.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A polyamide resin composition comprising:
   about 40 wt % to about 60 wt % of a polyamide resin comprising a repeat unit represented by Formula 1 and a repeat unit represented by Formula 2:

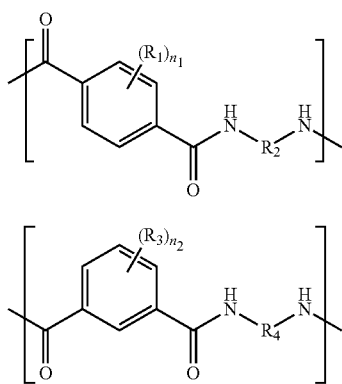

[Formula 1]

[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n_1$ and $n_2$ are the same or different and are each independently an integer of 0 to 4;

about 1 wt % to about 10 wt % of a maleic anhydride-modified ethylene-octene copolymer;

about 5 wt % to about 20 wt % of calcium carbonate surface treated with a silane compound; and about 20 wt % to about 40 wt % of glass fibers, wherein the silane compound comprises a functional group comprising an amino group, an epoxy group, and/or a (meth)acryloxy group, wherein the polyamide resin composition has a plating adhesive strength of about 15 N/cm to about 30 N/cm, as measured on an injection-molded specimen plated with a 30 μm thick chromium layer and having a size of 10 cm×10 cm×3.2 cm at a peeling rate of 50 mm/min using a tensile tester in accordance with JIS C6481, and wherein a weight ratio of the maleic anhydride-modified ethylene-octene copolymer to the calcium carbonate surface treated with the silane compound ranges from 1:1 to about 1:2.

2. The polyamide resin composition according to claim 1, wherein the polyamide resin comprises about 60 mol % to about 80 mol % of the repeat unit represented by Formula 1 and about 20 mol % to about 40 mol % of the repeat unit represented by Formula 2.

3. The polyamide resin composition according to claim 1, wherein the calcium carbonate surface treated with the silane compound has an average particle size of about 40 nm to about 150 nm.

4. The polyamide resin composition according to claim 1, wherein a surface of the calcium carbonate is entirely or partly surface treated with the silane compound.

5. The polyamide resin composition according to claim 1, wherein the polyamide resin composition has a notched Izod impact strength of about 8 kgf·cm/cm or more, as measured on a ⅛" thick specimen in accordance with ASTM D256.

6. The polyamide resin composition according to claim 1, wherein the polyamide resin composition has a heat deflection temperature (HDT) of about 280° C. or more, as measured under a load of 18.56 kgf/cm$^2$ at a heating rate of 120° C./hr in accordance with ASTM D648.

7. A molded article comprising:
   a base layer; and
   a plating layer formed on at least one surface of the base layer,
   wherein the base layer is formed of the polyamide resin composition according to claim 1.

8. The polyamide resin composition according to claim 1, wherein the polyamide resin composition has a notched Izod impact strength of about 8 kgf·cm/cm to about 15 kgf·cm/cm, as measured on a ⅛" thick specimen in accordance with ASTM D256; a heat deflection temperature (HDT) of about 280° C. to about 300° C., as measured under a load of 18.56 kgf/cm$^2$ at a heating rate of 120° C./hr in accordance with ASTM D648; and a surface gloss of 90 to 110 measured at a reflection angle of 75° on a specimen injection molded at a molding temperature of 320° C. and a mold temperature of 130° C. in a 6 oz. injection molding machine and having a size of 10 cm×10 cm×3.2 cm using a gloss meter.

9. The polyamide resin composition according to claim 1, wherein the polyamide resin composition has a plating adhesive strength of about 19 N/cm to about 25 N/cm, as measured on an injection-molded specimen plated with a 30 μm thick chromium layer and having a size of 10 cm×10 cm×3.2 cm at a peeling rate of 50 mm/min using a tensile tester in accordance with JIS C6481.

10. A polyamide resin composition comprising:
    about 40 wt % to about 60 wt % of a polyamide resin comprising a repeat unit represented by Formula 1 and a repeat unit represented by Formula 2:

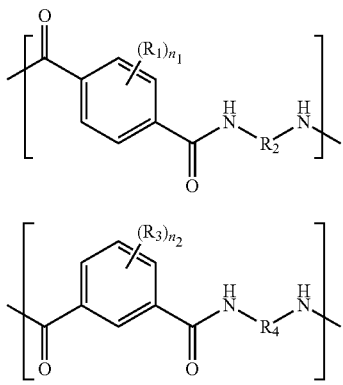

[Formula 1]

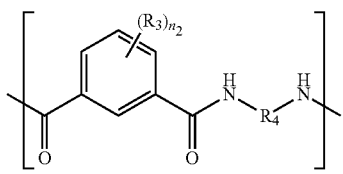

[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n_1$ and $n_2$ are the same or different and are each independently an integer of 0 to 4;

about 1 wt % to about 10 wt % of a maleic anhydride-modified olefin-based copolymer;

about 5 wt % to about 20 wt % of calcium carbonate surface treated with a silane compound; and about 20 wt % to about 40 wt % of glass fibers, wherein the silane compound comprises a functional group comprising an amino group, an epoxy group, and/or a (meth)acryloxy group, wherein the polyamide resin composition has a plating adhesive strength of about 19 N/cm to about 25 N/cm, as measured on an injection-molded specimen plated with a 30 μm thick chromium layer and having a size of 10 cm×10 cm×3.2 cm at a peeling rate of 50 mm/min using a tensile tester in accordance with JIS C6481, and wherein a weight ratio of the maleic anhydride-modified olefin-based copolymer to the calcium carbonate surface treated with the silane compound ranges from about 1:1 to about 1:5.

* * * * *